Sept. 13, 1960 K. A. RIEDEL ET AL 2,952,065
TWIN SPINDLE MILLING AND BORING MACHINE
Filed March 10, 1958 4 Sheets-Sheet 1
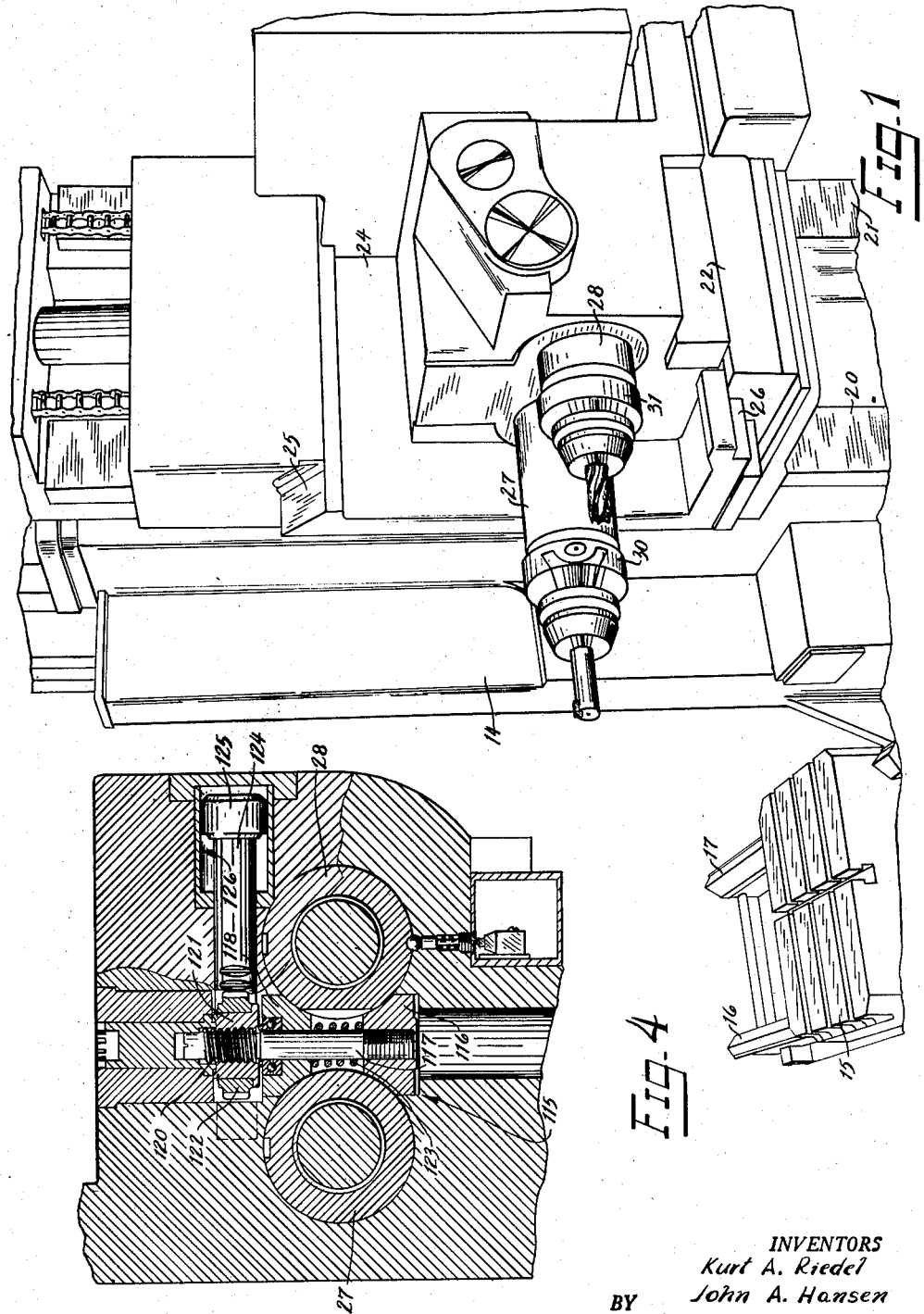
INVENTORS
Kurt A. Riedel
John A. Hansen
BY
George J. Wutschel
Attorney Sept. 13, 1960   K. A. RIEDEL ET AL   2,952,065
TWIN SPINDLE MILLING AND BORING MACHINE
Filed March 10, 1958   4 Sheets-Sheet 2

INVENTORS
Kurt A. Riedel
John A. Hansen
BY
Elroy J. Wutschel
Attorney

Sept. 13, 1960   K. A. RIEDEL ET AL   2,952,065
TWIN SPINDLE MILLING AND BORING MACHINE
Filed March 10, 1958   4 Sheets-Sheet 4

INVENTORS
Kurt A. Riedel
John A. Hansen
BY
Elroy J. Wutschel
Attorney

United States Patent Office 2,952,065
Patented Sept. 13, 1960

2,952,065

TWIN SPINDLE MILLING AND BORING MACHINE

Kurt A. Riedel, Milwaukee, and John A. Hansen, Greendale, Wis., assignors to Kearney & Trecker Corporation, West Allis, Wis., a corporation of Wisconsin Filed Mar. 10, 1958, Ser. No. 720,394

12 Claims. (Cl. 29—26)

This invention relates generally to machine tools, and more particularly to a twin spindle milling and boring machine having spindles that are alternately extended and retracted to facilitate changing from one cutting operation to another.

A general object of the invention is to provide an improved two spindle milling and boring machine.

Another object of the invention is to provide an improved two spindle machine tool in combination with an improved driving transmission mechanism for alternately supplying power to drive either spindle.

Another object of the invention is to provide an improved control mechanism for moving a spindle carrying quill to a forwardly extended position and simultaneously connecting a transmission to supply driving power to the tool spindle journalled therein.

Another object of the invention is to provide an improved two spindle machine tool, so arranged that retraction of one extended spindle automatically effects advancement of the other spindle to an operating position.

A further object of the invention is the provide an improved electro-hydraulic control mechanism for alternately retracting and extending a pair of spaced apart spindle carrying quills in a machine tool.

A further object of the invention is to provide in a machine tool a pair of spindle carrying quills that the operatively connected in a manner that retraction of one spindle effects automatic advancement of the other spindle into an operating position with means for clamping both quills against axial movement.

A still further object of the invention is to provide an improved two spindle machine tool including means for automatically locking both spindles against rotation to facilitate tool changing.

A still further object of the invention is to provide an improved twin spindle machine tool including a unitary control system operatively connected: to effect alternate retraction of one tool spindle and extension of the other tool spindle to an operating position; to clamp both spindle carrying quills in a selected position of operation; to shiftably disconnect a power driven transmission from the retracted spindle and reconnect it to drive the spindle that is in extended operating position; and, including a pair of releasable locks connectable to clamp both of the spindles against rotation to facilitate tool changing.

According to this invention, a machine tool of the bed type is provided with a bodily movable spindle head carrying two spindle quills spaced apart in parallelism. The spindle head is supported for bodily movement in three mutually perpendicular planes relative to a work supporting table that may be of the indexable type. Each of the axially movable spindle quills is provided with a rotatable tool spindle, the spindles being alternatively connectable to be driven by a single power transmission mechanism in accordance with the selected axial position of both spindles. A pair of racks are respectively secured to the spindle quills in a plane parallel to the plane of axial quill movement. A single pinion is disposed to interconnect the quill racks in such a manner that pinion rotation operates to retract the extended spindle quill and extend the retracted spindle quill into a forwardly fixed operating position. The quill moving pinion is likewise disposed to actuate a shifting mechanism for operatively interconnecting a single power driven transmission mechanism with whichever of the tool spindles is in its forward operating position. At the completion of a retracting cycle, both quills are rigidly secured in selected position by means of a single double acting clamp mechanism. The clamp mechanism is automatically unclamped at the start of a retraction cycle, and connected to automatically clamp the spindle quills after both of them have been moved to their opposite positions. An electro-hydraulic control system is operatively connected to selectively actuate the quill clamping and retracting mechanisms, and simultaneously actuate a creep motor to rotate the single shiftable spindle driving gear as quill shifting movement is being effected. In addition, the electro-hydraulic control system is adapted to actuate a pair of spindle clamps for clamping the spindles against rotation to facilitate tool changing or adjusting. The respective tool spindles are adapted to carry either conventional milling cutters, boring tools, or one boring tool and one milling cutter. By means of this arrangement, a selected tool may be retained in operative work engaging relationship with a workpiece; retracted at the completion of a particular milling or boring operation; and, another selected tool of required configuration operatively advanced into a position for engaging the workpiece in a subsequent machining operation.

The foregoing and other objects of the invention which will become more fully apparent from the following detailed description of machine structure and an electro-hydraulic control system exemplifying a preferred embodiment thereof, may be achieved by the particular structure and control system described herein in connection with the accompanying drawings, in which:

Figure 1 is an enlarged fragmentary perspective view of a particular machine tool incorporating the invention;

Fig. 4 is a fragmentary view in longitudinal vertical section through the forward portion of the spindle carrying head, showing the quill clamp mechanism shown schematically in Fig. 5;

Figure 3:
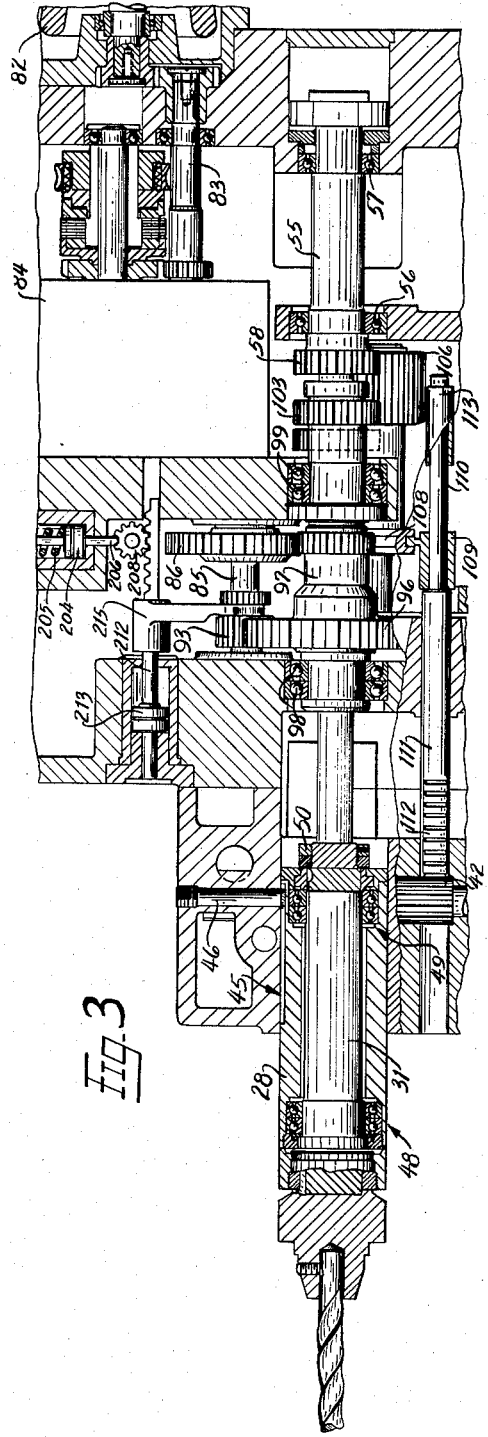
Fig. 3 is a view in transverse vertical section through the spindle carrying head, and taken principally along the lines 3—3 in Fig. 2.

Referring more specifically to the drawings, the machine tool shown in Fig. 1 thereof as incorporating a preferred embodiment of the invention is a combined milling and boring machine. The principal supporting structure comprises an upwardly extending column structure 14 that is slidably mounted for longitudinal movement upon a supporting bed (not shown), the latter being disposed to support an indexable rotary table or pallet 15. The pallet 15 is preferably carried for selected indexable movement relative to the column 14, and is moved into its operating position by means of transfer way surfaces 16 and 17. The upstanding column 14 is provided with vertical way surfaces 20 and 21 disposed to slidably engage cooperating way surfaces presented by a vertically adjustable saddle 22.

A spindle carrying head 24 is provided with an angularly disposed upper way surface 25 and a parallel lower spaced way surface 26. The vertically movable saddle 22 is provided with complementary transverse way surfaces disposed to slidably engage way surfaces 25 and 26 in a manner to support the spindle head 24 for bodily transverse movement relative to the worktable 15. A pair of circular spindle supporting quills 27 and 28 are slidably carried by the spindle head 24 for alternate extensible movement relative thereto. As shown in Fig. 1, the spindle quill 27 is in a forwardly extended working position, and the spindle quill 28 is in a retracted position relative to the spindle head 24. A pair of rotatable tool carrying spindles 30 and 31 are respectively journalled within the supporting quills 27 and 28. As shown in Fig. 1, the extended spindle 30 is provided with a radially adjustable single point boring head disposed to support a single point boring tool. The tool spindle 31 is shown as being provided with a quick change collet holder adapted to support a milling cutter, in this case an end mill. It will be apparent that the tool spindles 30 and 31 may be provided with any suitable tool holding means for removably supporting milling cutters, boring bars, or drills.

Figure 2:
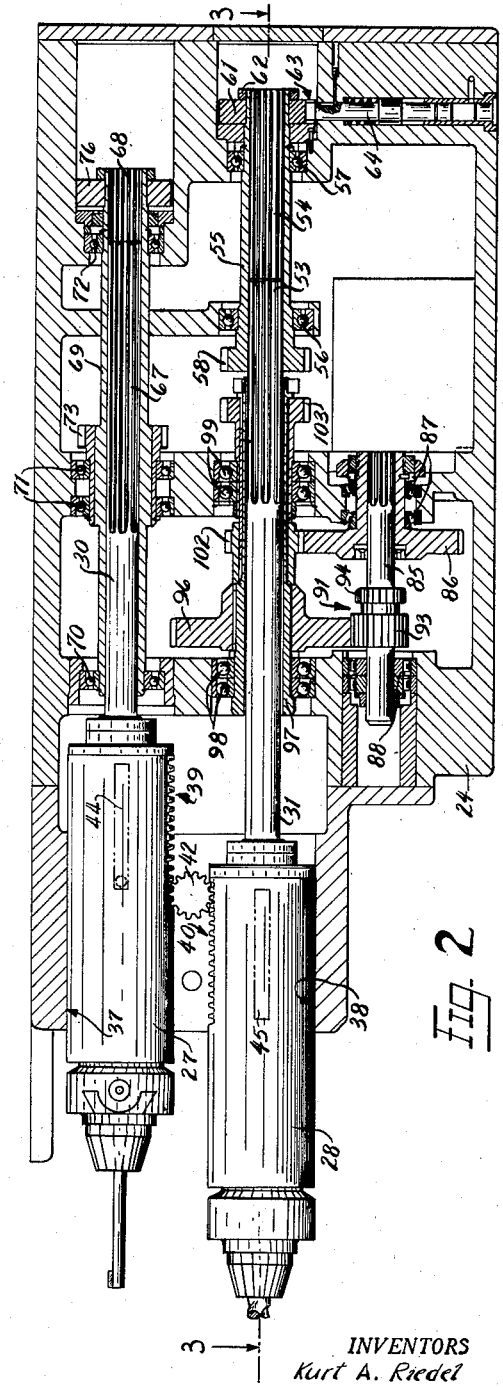
Fig. 2 is a view partly in elevation, and principally in transverse horizontal section through the spindle carrying head showing a portion of the internal driving mechanism.

As shown in Fig. 2, the spindle head 24 is provided with a pair of spaced apart cylindrical bored openings 37 and 38 respectively disposed to slidably constrain the spindle quills 27 and 28 for axial transverse movement relative to the work support. Each of the quills 27 and 28 is likewise provided on its inner periphery with longitudinally extending rack teeth 39 and 40 respectively disposed to be simultaneously engaged by a single elongated pinion 42. As shown in Fig. 2, rotation of the pinion 42 will simultaneously effect axial forward movement of the spindle quill 27 to its working station and retracting movement of the spindle quill 28. With such a condition existing, clockwise rotation of the pinion 42 will effect a return retracting movement of quill 27 and forward extensible movement of quill 28 to the positions shown in Fig. 2. To prevent rotational movement and limit their range of axial movement, the quills 27 and 28 are respectively provided on their peripheries with longitudinally extending keyways 44 and 45. As shown in Fig. 3, the quill keyway 45 is engaged by the inwardly extending end of a circular key 46 carried by the spindle head 24. In a similar manner, the quill keyway 44 is engaged by a circular key (not shown).

Inasmuch as both of the spindles 30 and 31 are journalled in their associated quills in identical fashion, only the spindle 31 will be described. As shown in Fig. 3, the spindle 31 is rotatably supported by antifriction bearings 48, carried in the forward portion of the quill 28, and rearwardly spaced antifriction bearings 49. A single bearing adjusting nut 50 threadedly engaging the spindle 31 operates to adjust the bearings 48 and 49, the outer races of which are respectively constrained in oppositely flanged openings provided in the quill 28.

Figure 5:
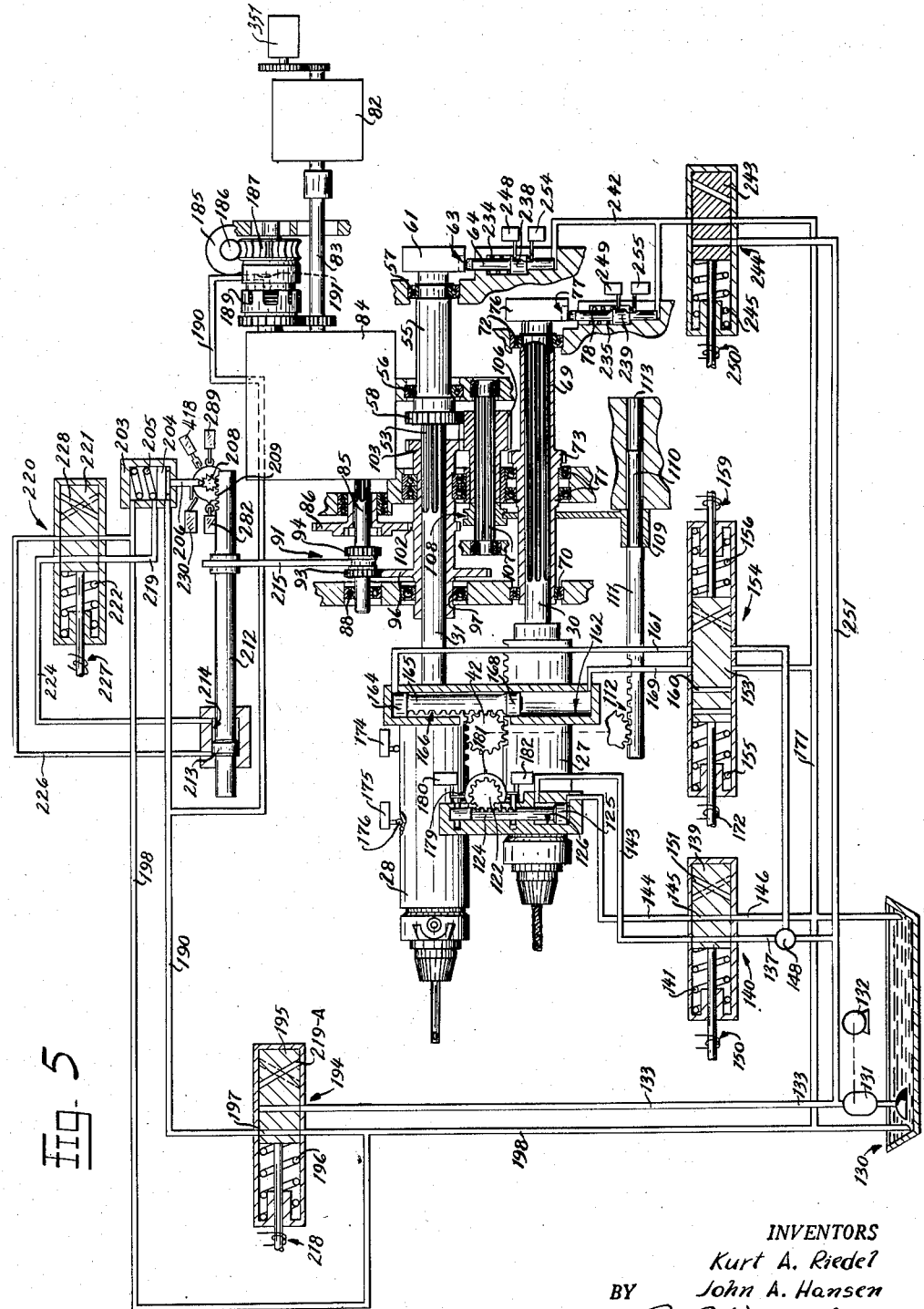
Fig. 5 is an enlarged diagrammatic view of the twin spindle and quill mechanism in combination with the hydraulic control system therefore.

Toward its rearward end, as shown in Figs. 2 and 5, the spindle 31 is provided with longitudinal splines 53 disposed to slidably engage internal splines 54 formed within a concentrically rotatable drive sleeve 55. The tubular drive sleeve 55 is rotatably supported in spaced apart antifriction bearings 56 and 57, the outer races of which are supported within concentrically formed bored openings formed in the spindle head frame 24. The internally splined drive sleeve 55 is integrally formed with a power driving input gear 58 that is operatively connected to receive driving input power for rotating the tool spindle 31 whenever the latter is in its forwardly extended operating position, as shown in Figs. 2, 3 and 5. At its outwardly extending end, the drive sleeve 55 is provided with a circular locking collar 61 that is fixedly secured thereto by means of a lock nut 62 threaded on the outer end of the drive sleeve. The locking collar 61 is provided on its periphery with a single clamping notch 63 that may be selectively engaged by a radially movable clamp plunger 64 slidably carried within a bored opening formed in the spindle head 24. The radial clamp plunger 64 may be moved inwardly to engage the single clamp notch 63 to lock the drive sleeve 55 and spindle 31 against rotation, for facilitating changing or adjusting tools, whenever no power is being supplied to drive the tool spindle 31 at normal operating speeds.

In a similar manner, the spindle 30 is provided toward its rearward end with longitudinal splines 67 disposed to slidably engage internal splines 68 presented by a concentrically rotatable, elongated drive sleeve 69. Spaced apart antifriction bearings 70, 71 and 72 having their outer races supported within enlarged bored openings formed in the spindle head 24 are disposed to rotatably support the elongated drive sleeve 69. Toward its central portion, the drive sleeve 69 is provided with an enlarged portion having secured thereto the hub of an input drive gear 73, the outer hub of which is directly supported by the inner races of bearings 71. Whenever the supporting quill 27 and tool spindle 30 are moved to a forward operating position, the input gear 73 is connected to be rotatably driven in a manner to rotate the sleeve 69 and the telescopingly engaged tool spindle 30. At its rearward end, the drive sleeve 69 fixedly carries a clamp collar 76 provided on its periphery with a single clamp notch 77, as shown in Figs. 2 and 5. A radially movable clamping plunger 78 slidably carried within a bored opening formed in the spindle head 24 is selectively movable into locking engagement with the clamp collar.

Power for rotatably driving the tool spindle 30 or 31 is derived from a main drive motor 82 carried by the spindle head 24, as shown in Figs. 3 and 5. From the motor 82, power is transmitted by a shaft 83 to drive a variable speed transmission mechanism 84, which may be of the shiftable or infinitely variable speed type. Power is transmitted from the variable speed transmission 84 to rotate an axially shiftable range change shaft 85 slidably supported within a bored opening formed in the hub of a high speed spindle drive gear 86. As shown in Fig. 2, the high speed spindle gear 86 is provided with an elongated hub rotatably journalled within a pair of spaced apart antifriction bearings 87 carried by a bored opening formed in the spindle head 24. At one end, the rotatable range change shaft 85 is slidably carried for axial shifting movement within the inner race 88 of a bearing supported by the spindle head 24. The opposite or inner end of the range change shaft 85 is provided with axial splines disposed to engage an internally splined shaft (not shown) journalled within the variable speed transmission mechanism 84. A range change couplet 91 fixedly secured to the axially shiftable range change shaft 85 is provided with a low speed spindle drive gear 93 and a clutch gear 94. By means of this arrangement, the range change couplet may be shifted leftwardly as shown in Figs. 2, 3 and 5 in a manner that the low speed gear 93 meshingly engages a low speed spindle gear 96 keyed directly to a rotatably journalled tubular drive sleeve 97. Likewise, the couplet 91 and shaft 85 may be shifted rightwardly in a manner that the clutch gear 94 engages a complementary internal clutch gear integrally formed within the high speed spindle drive gear 86. The tubular spindle drive sleeve 97 is journalled in bearings 98 and 99, Figs. 3 and 5, carried by the spindle head for rotation independently of the tool spindle 31, the central portion of which extends through a slightly enlarged bored opening formed within the sleeve 97. Engagement of low speed gear 93 with gear 96, as shown, effects rotation of the tubular spindle drive sleeve 97 at a selected speed in a low range. High speed spindle driving gear 86 is continuously maintained in engagement with a high speed drive gear 102 keyed to the spindle drive sleeve 97. Thus, shiftable rightward movement of the couplet 91 in a manner that clutch gear 94 engages the complementary internal gear presented by the high speed gear 86 effects rotation of the tubular spindle drive sleeve 97 at a selected speed in a high range, depending on the adjusted speed rate of the transmission 84. A spindle driving output gear 103 keyed directly to the spindle drive sleeve 97 is thus connected to be driven at selected speed in either a high or a low operating range.

To transmit power from the spindle driving output gear 103 to either the spindle input gear 58 or 73, there is provided a wide faced, axially shiftable transfer gear 106 continuously engaging the spindle output gear 103. The shiftable transfer gear 106 is provided with an internally splined elongated hub engaging a splined shaft 107 rotatably journalled at its opposite ends in bearings carried by the spindle head 24. With the transfer gear 106 shifted rightwardly, as shown in the drawings, power is transmitted from the spindle output gear 103 to rotate input gear 58 for rotatably driving the outwardly extended tool spindle 31. Whenever the tool spindle 31 is retracted and spindle 30 extended, the transfer gear 106 is disengaged from spindle gear 58 and engaged with the gear 73.

To effect axial shifting movement of the transfer gear 106, as shown in Figs. 3 and 5, the elongated hub thereof is provided with an annular groove 108 engaged by the inwardly extending arm of an axially movable shifter fork 109. The shifter fork 109 is provided with a bored opening slidably engaged by a reduced diameter portion 110 of an axially movable shifting rod 111, as well as a spaced apart bored opening (not shown) disposed to slidably engage a guide rod (not shown) parallel to the movable rod 111. At its forward end, the movable shifter rod 111 is provided with rack teeth 112 meshingly engaging one end of the elongated spindle retracting pinion 42.

As the pinion 42 is rotated in a clockwise direction to effect outward movement of the spindle quill 27, the pinion 42 simultaneously effects outward or leftward movement of shifting rod 111. As the spindle quill 27 approaches its extended operating position, the shifting fork 109 is engaged by a shoulder presented by a shifting collar 113 fixedly secured to the reduced diameter portion 110 of the longitudinally movable shifter rod 111. Engagement of fork 109 with shifting collar 113 thus effects movement of fork 109 and shifting movement of gear 106 into engagement with drive gear 73 simultaneously with the final movement of quill 27 to its operating position. With this condition existing, of course, quill 28, is fully retracted and transfer gear 106 is disengaged from input gear 58 associated with spindle 31.

In a like manner, rotation of pinion 42 in a direction for moving quill 28 forwardly to the extended position shown in Fig. 2 effects rightward movement of the shifting rod 111. With this condition existing, the shoulder presented by the full diameter of shifting rod 111 engages shifter fork 109 to effect corresponding rightward shifting movement of transfer gear 106 into engagement with input gear 58 associated with spindle 31. It will be apparent that the shifting fork 109 is moved in coordinated relationship with the spindle quills 27 and 28 upon rotation of the elongated pinion 42. Due to the lost motion connection between fork 109 and the reduced diameter 110 of axially movable rod 111, however, the full extent of transfer gear shifting movement is considerably less than movement of either of the spindle quills 27 or 28 to their respective forward operating positions.

At the start of a quill shifting movement a clamp mechanism 115, Fig. 4, is actuated to disengaged position. Conversely, at the completion of a shifting movement with one spindle quill fully extended and the other fully retracted, the clamp mechanism 115 is again automatically actuated to clamp both spindle quills 27 and 28 in their selected axially adjusted positions. The clamp mechanism 115 comprises essentially a clamp element 116 fixedly secured to one end of an axially movable clamp actuating rod 117 extending through an enlarged bored opening in a floating clamp element 118. At its opposite end, the actuating rod 117 is provided with screw threads 120 operatively engaged by a rotatably journalled actuating nut 121 having fixedly secured to its periphery a pinion 122. Clockwise rotation of the pinion 122 and nut 121 urges the inner face of the nut 121 in abutting engagement with the outer race of a thrust bearing, thereby urging the clamp elements 116 and 118 toward one another into clamping engagement with the spindle quills 27 and 28. In a similar manner, counterclockwise rotation of the nut 121 releases clamping pressure upon the clamping elements, permitting a spring 123 to urge the clamp elements 116 and 118 into unclamped or disengaged position relative to the spindle quills. Both of the movable clamp elements 116 and 118 are provided with arcuate clamp engaging surfaces conforming to and disposed to clampingly engage a portion of the periphery of quill 27 and the quill 28. To actuate the clamp mechanism 115, the pinion 122 is disposed to meshingly engage rack teeth integrally formed with a transversely slidable piston rod 124 having secured to its opposite end a piston 125 slidably constrainted within a cooperating hydraulic cylinder 126. With the piston 125 positioned in the outer end of the cylinder 126, as shown in Figs. 4 and 5, the pinion 122 is urged to rotate in a clockwise direction to securely clamp both of the spindle quills 27 and 28 against axial movement during a machining operation.

To effect the various shifting and clamping functions, there is provided an electro-hydraulic control system, the hydraulic system being schematically shown in Fig. 5. From a sump 130 contained within the spindle head, hydraulic fluid is withdrawn by means of a pump 131 connected to be driven by a motor 132. The pump 131 is connected to supply fluid under pressure to a high pressure line 133 that is connectable to actuate the range changer 91 as well as the spindle lock plungers 64 and 78. At the same time, as schematically shown in Fig. 5, the supply line 133 is connected via line 251, and pressure regulating valve 148 to supply fluid at reduced pressure to line 137 connected to effect selective clamping and shifting movement of the spindle quills 27 and 28. For purposes of the description, it is necessary only that the lines 133 and 137 be differentiated as to the pressure supply.

With a valve spool 139 of a solenoid valve 140 urged rightwardly by means of a spring 141, pressure fluid is transmitted from the main supply line 137 to a line 143 connected at its opposite end to transmit fluid to the cylinder 126. Admission of pressure fluid from the line 143 urges the piston 125 outwardly to rotate the pinion 122 in a direction to urge clamp elements 116, 118, Fig. 4, into clamping engagement with the spindle quills. With this condition existing, the opposite end of the cylinder is connected to exhaust via a line 144 and a valve spool groove 145, and thence to an exhaust line 146. The exhaust line 146 is in turn connected to return fluid to the sump 130. Whenever the quills 27 and 28 are to be shifted axially, a solenoid 150 is energized to effect leftward movement of the valve spool 139, thereby connecting the main pressure line 137 via valve spool groove 151 directly to the line 144. With the piston 125 urged in the opposite direction to unclamp the quills, an exhaust line is then completed from line 143 connected through the energized valve spool to the exhaust line 146.

Whenever the quills 27 and 28 are clamped against movement, a valve spool 153 of a quill shifting valve 154 is maintained in neutral position by means of compression springs 155 and 156.

After the quills are unclamped by operation of valve 140, a solenoid 159 is energizable to effect rightward movement of the valve spool 153, connecting the pressure supply line to transmit hydraulic fluid through the valve spool groove 160 to a line 161. At its opposite end, the supply line 161 is connected to transmit pressure fluid into one end of a quill shift cylinder 162, thereby effecting movement of piston 164. The piston 164 is secured to one end of a circular rack 165 presenting rack teeth 166 directly engaging the rotatable pinion 42. Thus, downward movement of the piston 164, Fig. 5, rotates pinion 42 to retract quill 28 and simultaneously urge quill 27 outwardly to its operating position. As hereinbefore explained, rotation of pinion 42 effects shifting movement of the transfer gear 106 into engagement with the input gear 73 associated with spindle 30. As the piston 164 moves downwardly, a piston 168 secured to the opposite end of the circular rack 165 forces hydraulic fluid from the lower portion of the cylinder 162 outwardly through a line 169. From the line 169, the flow of fluid continues through a cannelure in the valve spool 153 to an exhaust line 171, and thence continues through the valve 147 to the sump 130.

Position indicating switches 174 and 175 are actuated by an indented cam surface 176 presented by the quill 28. Whenever the quill 28 is extended to its forward operating position, as shown, the cam surface 176 actuates switch 175. Conversely, whenever quill 27 is extended and quill 28 is retracted, the cam surface 176 actuates switch 174. Conversely, to return the quill 28 to its forwardly extended position, as shown in Fig. 5, the valve spool 153 is urged leftwardly in opposition to spring 155 by energizing solenoid 172. It will be apparent that leftward movement of valve spool 153 effects a transmission of fluid from the pressure line to line 169, thereby causing a return movement of the piston 168 upwardly to the position shown in Fig. 5. As this occurs, spindle quill 28 is again moved to forwardly extended position, and quill 27 is retracted.

Figure 8:
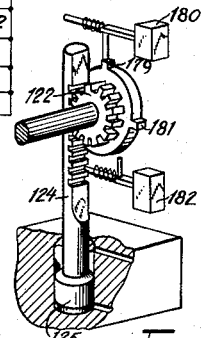

In a similar manner, as shown in Figs. 5 and 8, a cam 179 carried for rotation with the clamping pinion 122 is connected to actuate switch 180, whenever both of the quills are clamped in axially adjusted position. Likewise, a cam 181 carried for rotation with actuating pinion 122 is disposed to actuate a switch 182 whenever the clamping piston 125 is actuated to unclamp the quills.

During shiftable adjustment of the range change couplet 91, or during shiftable adjustment of the transfer gear 106 upon retracting movement of one of the quills, the transmission mechanism is connected to be rotated at slow speed to facilitate shifting gears. To accomplish this, a creep motor 185 is connected to drive a worm 186 having meshing engagement with a worm wheel 187. Energization of the creep motor 185 is effected simultaneously with engagement of a multiple disc clutch 189 to connect the speed changer 84 and interconnected gearing in the transmission for rotation at a slow speed. Engagement of the clutch 189 is effected by the admission of hydraulic fluid under pressure by a line 190 that is connected in well known manner to transmit fluid to a drilled line 191 for operating the clutch 189. During normal machine operation, the hydraulic line 190 is connected to exhaust and both the creep motor 185 and the clutch 189 are deactivated. A valve 194 is operative to connect the line 190 either to exhaust or to a fluid pressure supply line. With a valve spool 195 of valve 194 biased in a rightward direction by a spring 196, as shown in Fig. 5, the line 190 is connected via a valve spool groove 197 to an exhaust line 198.

Connection of the line 190 to exhaust likewise exhausts hydraulic fluid from the lower end of a range change locking cylinder 203. A piston 204 carried within the cylinder 203 is normally biased downwardly by a spring 205 in a manner that a locking member 206 engages a rotatable pinion 208. The pinion 208, in turn, is in meshing engagement with rack teeth 209 presented by a longitudinally movable piston rod 212. At its opposite end, the piston rod 212 is secured to a piston 213 constrained to slide within a hydraulic cylinder 214. A shifter fork 215 secured to the piston rod 212 engages with its opposite end an annular groove presented by the shiftable range change couplet 91. As indicated in Fig. 5, the mechanical locking member 206 engages the pinion 208 to provide a positive mechanical interlock for retaining the range change couplet 91 in shiftably adjusted position. Thus, to actuate the piston 213 for moving the fork 215, it is necessary to first retract the locking member 206 from engagement with pinion 208.

To accomplish this, a solenoid 218 of the valve 194 is energized to effect leftward movement of the valve spool 195, thereby connecting the main pressure supply line 133 via a valve spool groove 219A to the hydraulic line 190. Admission of fluid to the cylinder 203 from line 190 effects upward movement of the piston 204 and effects a corresponding retracting movement of the locking member 206. The flow of fluid pressure from line 190 continues through the cylinder to an outlet line 219 and thence, depending upon the position of a range change valve 220, to the hydraulic cylinder 214.

With a valve spool 221 of range change valve 220 urged rightwardly by a spring 222, pressure fluid from line 219 continues via a valve spool groove to a line 224 connected to effect leftward movement of the piston 213. Inasmuch as the piston 213 is already in leftward position, as shown in Fig. 5, this particular condition will exist only in the event the main hydraulic valve 194 is activated to effect adjustment of the speed changer 84 or axial movement of the quills 27 and 28. During leftward movement of the piston 213, fluid is exhausted from the cylinder 214 via a line 226, a cannelure in the rightwardly biased valve spool 221, to the main exhaust line 198.

To effect rightward shifting movement of the couplet 91, a solenoid 227 of the range change valve 220 is energized to effect leftward movement of the valve spool 221, thereby connecting the pressure line 219 via a groove 228 to the line 226. Normally, during a range change, the solenoid 227 is actually energized prior to energization of the main hydraulic valve solenoid 218. Thus, upon energization of solenoid 218, conditions have already been established to effect transmission of hydraulic fluid from pressure line 190, via interlocking cylinder 203, to initiate the required range change.

It should be noted that retracting movement of the locking member 206 actuates an interlock switch 230 that is operative to preclude energization of the main spindle driving motor 82 during any shiftable adjustment.

To facilitate the adjustment of or removal of cutting tools from the spindles, one of the locking plungers 64 and 78 is moved inwardly to engage a respective one of the locking notches 63 and 77. Actually, only the forwardly extended spindle is locked against rotation because only the forwardly extended spindle is connectable to be rotated for aligning an associated index notch with the radially movable locking member. The arrangement fully disclosed and described is adapted to facilitate the removal of cutting tools, such as those shown and described in connection with Fig. 1. However, this arrangement is likewise particularly adaptable to facilitate tool adjustment effected by rotatable shafts (not shown) that may extend inwardly through the hollow center portions of the respective tool spindles 31 and 30. In such a case, as is well known in the art, the rotatable shafts (not shown) would be actuatable from their upper ends to effect their desired adjustment of boring tools supported at the extreme lower ends of the respective spindles.

As shown in Fig. 5, both of the locking members 64 and 78 are urged downwardly by means of springs 234 and 235 to a fully retracted nonoperative position. The locking members 64 and 78 have secured to their central portions pistons 238 and 239 respectively, that are constrained to move within associated hydraulic cylinders that are both connected to a single hydraulic line 242. With a valve spool 243 of a control valve 244 urged rightwardly by a spring 245, as shown in Fig. 5, the line 242 is connected via a valve spool groove directly to the main exhaust line 171. Whenever the hydraulic line 242 is connected to exhaust, and both locking members 64 and 78 are fully retracted, interlock switches 248 and 249 are actuated to their normally closed positions for conditioning the circuit to permit energization of the main drive spindle motor 82.

For urging one or another of members 64 and 78 into spindle locking engagement, a solenoid 250 is energized to effect leftward movement of the valve spool 243 and connecting a main pressure supply line 251 directly to the line 242. In spite of the fact that pressure fluid from line 242 urges both of the pistons 238 and 239 to move inwardly, the angular position of the locking collars 61 and 76 may preclude radially inward engagement of the locking plungers. This is due to the fact that the single index notches 63 and 77 respectively presented by locking collars 61 and 76 must be angularly aligned with the locking members.

As hereinbefore explained, only the spindle which is in its forwardly extended operating position may be locked against angular rotation. Whichever of the tool spindles is in forwardly extended position, is connected by means of the shiftable transfer gear 106 to be driven by the creep motor 185. Thus, whenever the solenoid 250 is energized to lock a tool spindle against rotation, the creep motor 185 and main hydraulic valve solenoid 218 are simultaneously energized. By means of this arrangement, the spindle which is to be locked against rotation, in this case spindle 31, is connected to be rotated at extremely slow speed until the notch 63 is angularly positioned to permit hydraulically actuated inward movement of locking plunger 64. Inward movement of the locking plunger simultaneously actuates switch 248 and a switch 254. The switch 248 is opened to preclude energization of the main drive motor 82, and the switch 254 is opened to effect de-energization of creep motor 185 and hydraulic valve solenoid 218. With this condition existing, the tool spindle 31 is fixedly locked against rotational movement to facilitate changing or adjusting a cutting tool.

In a similar manner, the locking member 78 may be moved inwardly by admission of fluid pressure from line 242, thereby actuating switch 249 and a switch 255 to open position. After the required cutting tool adjustment has been effected, whichever of the tool spindles has been locked against rotation may be unlatched by de-energizing solenoid 250, permitting resiliently biased rightward movement of the valve spool 243. This connects the hydraulic line 242 to the main exhaust line, removing the pressure from pistons 238 and 239, to permit resiliently biased retracting movement of the locking plungers 64 and 78.

Figure 6:
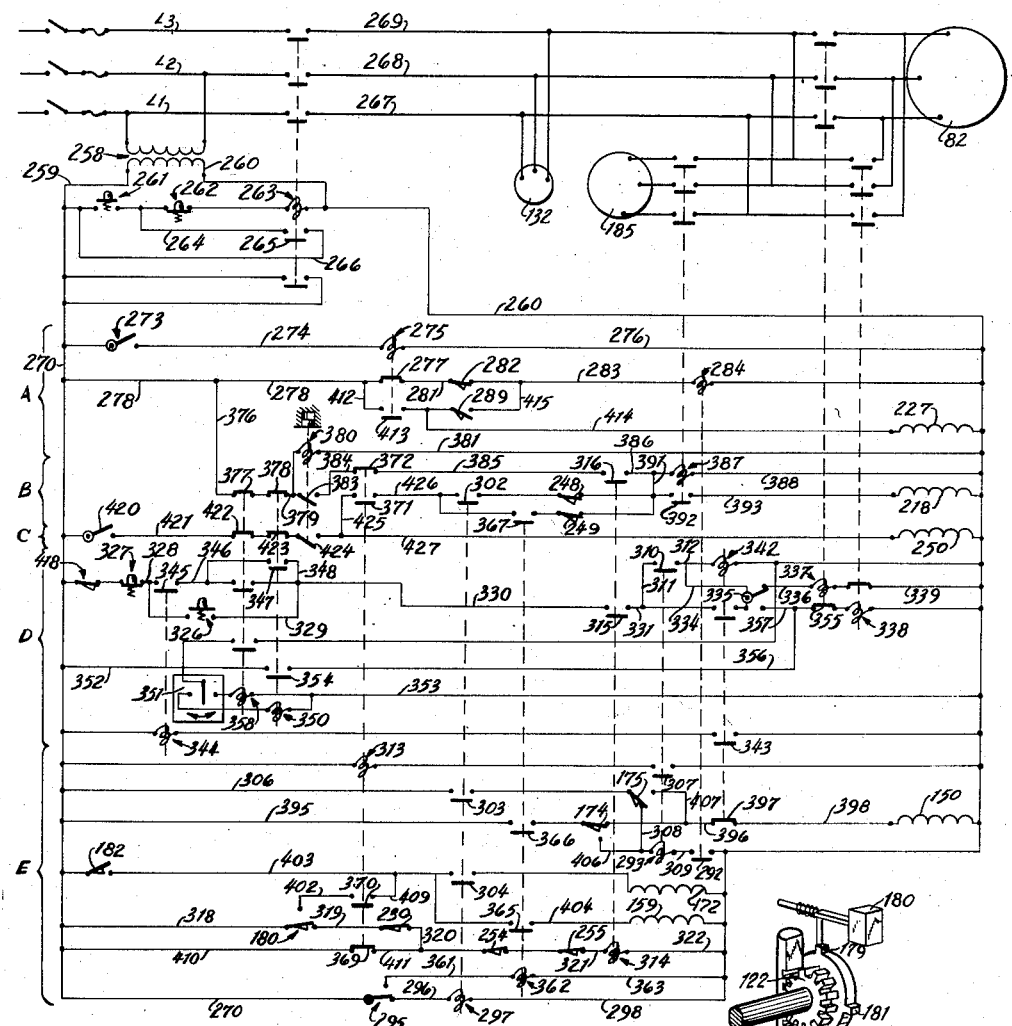
Fig. 6 is a diagrammatic view of an electrical control circuit for actuating the hydraulic control mechanism.

As schematically shown in Fig. 6, there is provided an electrical control circuit provided with the usual three phase power supply connected by a fused disconnect switch to energize line conductors $L_1$, $L_2$ and $L_3$. From conductors $L_1$ and $L_2$, a circuit is completed to energize the primary winding of a control transformer 258, provided with a secondary winding connected to supply control current of the desired reduced voltage to energize conductors 259 and 260. To energize both the power supply circuit and control circuit, a start button switch 261 is momentarily depressed, thereby completing a circuit from conductor 259, a normally closed stop button switch 262, and the coil of a master control relay 263 to energized conductor 260. Upon releasing switch 261 a holding circuit for retaining relay 263 energized is completed via a conductor 264, upwardly closed contact bar 265 to a conductor 266 connected to conductor 259.

Closure of the three upper contact bars associated with relay 263 completes a circuit from line conductors $L_1$, $L_2$ and $L_3$ to energize motor supply conductors 267, 268 and 269. At the same time, closure of a lower contact bar associated with the relay 263 completes a circuit from conductor 259 to energize a control conductor 270. With the master control relay 263 retained in energized closed position, both the control circuit conductors and power supply conductors are energized to effect machine operation. However, due to the predeterminately positioned shiftable elements shown in Fig. 5, including the alternately retractable and extensible spindle quills 27 and 28, the control circuit shown in Fig. 6 is conditioned for a particular mode of machine operation. The various interlock switches shown in Fig. 6 are positioned in accordance with the particular positions of adjustment of the shiftable elements shown in Fig. 5. For example, a range change control switch 273 is shown in open position, thereby conditioning the spindle for low range operation with the shiftable gear 93 engaging the low speed driving gear 96, Fig. 5.

To provide a simplified general consideration of the circuit, letter designations A, B, C, D and E applied to separate bracket portions thereof indicate generally the origination of the various shiftable and control functions. That portion of the circuit indicated at A is directed to the range change; B to the creep-start function; and, C to the spindle lock. In a similar manner, D refers generally to the start-stop spindle motor control, and E to the quill shift control. Obviously, these five portions of the circuit are so interconnected as to preclude simultaneous actuation of two non-compatible machine functions. To facilitate engagement of the shiftable gears, creep motor 185 is energized in response to B whenever either range shift A or quill shift E are activated to effect the selected function.

Figure 7:
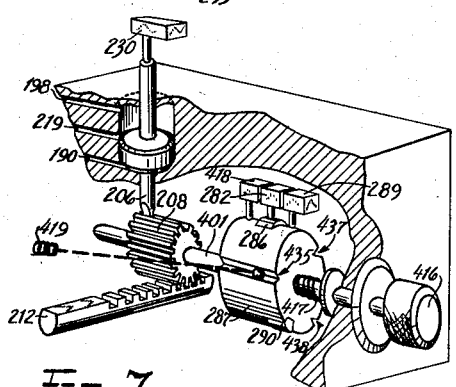
Fig. 7 is an enlarged fragmentary view in perspective of the mechanism for effecting manual adjustment of the range change mechanism; and, Fig. 8 is an enlarged fragmentary view in perspective of the switch actuating mechanism responsive to movement of the clamping mechanism to clamped or unclamped position.

The range change switch 273 is interconnected between the conductor 270 and a conductor 274 connected to one terminal of a coil for a range change relay 275, the opposite terminal being connected via a conductor 276 to the conductor 260. With the switch 273 in open low range position, relay 275 is de-energized and a contact bar 277 associated therewith is in normally closed bridging engagement between energized conductor 278 and a conductor 281. A low range shift completed circuit is continued from conductor 281, via a closed position indicating switch 282, to a conductor 283 to energize a "shift completed" relay 284, having the opposite terminal of its coil connected to conductor 260. Whenever the gear couplet 91 is in low range position, as shown in Figs. 5 and 7, the interlocking switch 282 is actuated to closed position by means of a cam lobe 286 secured to a cam drum 287 carried for rotation with the pinion 208. At the same time, as shown in Figs. 5, 6 and 7, a high range "shift completed" indicating switch 289 is in open position whenever the transmission is operated at low speeds. As will hereinafter be more fully explained, repositioning of couplet 91 for high speed operation, operates to open switch 282 and close switch 289, which then is engaged by a cam lobe 290 carried by the cam drum 287. After either a high or low range shifting movement is effected, the "shift completed" relay 284 is energized, in the present instance through closure of contact bar 277 and switch 282. Energization of relay 284 effects closure of a lower contact bar 292, thus conditioning the circuit for energization of another "shift completed" relay 293 for effecting subsequent energization of the main drive spindle motor 82. Energization of shift completed relay 293, however, is further conditioned upon the fact that one or the other of the spindle quills 27, 28 must be in fully extended operating position, and with the quill clamps 116, 118 operatively engaged.

With the described condition existing, i.e. the spindle quill 28 extended and spindle quill 27 fully retracted, a quill selector switch 295 is positioned as shown in Fig. 6. With the switch 295 positioned to effect forward movement of quill 28, as shown in Figs. 5 and 6, a circuit is completed from conductor 270, conductor 296 through the coil of a relay 297 to conductor 298 connected to the energized conductor 260. Energization of the relay 297 effects movement of associated contact bars 302, 303 and 304 to upwardly closed position. Closure of the contact bar 303 completes a circuit from an energized conductor 306, the closed contact bar of position indicating switch 175 to a conductor 308. This circuit then continues from conductor 308 through the coil of the "shift completed" relay 293 to a conductor 309 connected through the closed contact bar 292 of energized relay 294 to the conductor 260. Energization of the relay 293 effects closure of an upper contact bar 310 into bridging engagement between conductors 311 and 312, permitting subsequent energization of the spindle driving motor 82. It will be apparent that relay 293 is not energizable to closed position until both of the two shift conditions are satisfied, i.e. the range change couplet is in shiftably adjusted position and one of the spindle quills is in a forward operating position. The electrical circuit for indicating that the quill 28 is in forward position is completed by movement of the switch 175 to the position shown in Fig. 6, in response to engagement with the indented cam surface 176, Fig. 5. Energization of the relay 293 likewise effects closure of the contact bar 307 to effect a concomitant energization of a relay 313. In the event a quill shift has not been completed, the relays 293 and 313 are de-energized to initiate energization of the creep motor and engagement of the multiple disc clutch 189.

Before the spindle motor 82 may be energized to drive the tool spindle, it is necessary that the range change couplet locking member 206 be fully engaged, that both of the spindle locking members 64 and 78 are fully retracted, and the quills are clamped in selected position. As shown in Figs. 5 and 6, interlocking switches 180, 230, 254 and 255 are in closed position, indicating that these three conditions are satisfied. Another circuit is completed through the interlocking switches to energize a relay 314, effecting closure of associated contact bars 315 and 316. Contact bar 315 is interconnected in the control circuit for permitting energization of the spindle driving motor 82. The circuit for energizing relay 314 is completed from the conductor 270, a conductor 318, the closed contact bar of switch 180 to a conductor 319. From the conductor 319, this circuit continues through the closed contact bar of switch 230, to a conductor 320, and thence through the closed contact bars of switches 254, 255 to a conductor 321. The circuit continues from the conductor 321 through the coil of the relay 314 to a conductor 322 connected to the energized control conductor 260.

With all of these conditions having been fully satisfied, the spindle motor 82 may be energized by momentarily depressing a spindle start button switch 326. Depressing the start switch 326 completes a circuit from conductor 270, via the normally closed contact bar of a stop switch 327, a conductor 328 to a conductor 329. From the conductor 329, this circuit continues via a conductor 330, closed contact bar 315 of energized relay 314 to a conductor 331. The conductor 331 is connected to a conductor 311, the closed contact bar 310 to a conductor 312. From conductor 312, one circuit continues via a conductor 334, the closed contact bar of a manually adjustable directional switch 335, to a conductor 336 connected to one terminal of a coil for a forward motor starting relay 337. The circuit is completed from the coil of the relay 337 through the normally closed contact bar of a reverse motor relay 338 to a conductor 339 connected to the control conductor 260. Energization of the forward motor relay 337 effects closure of three upper contact bars associated therewith to transmit current from the energized main supply conductors 267, 268 and 269 for energizing the spindle motor 82.

Upon energization of relay 337, another parallel circuit is established from common conductor 312 to energize a holding circuit relay 342 having the opposite terminal of its coil connected to energized conductor 260. Energization of the relay 342 effects closure of a contact bar 343 to energize another holding circuit relay 344, thereby effecting closure of an associated contact bar 345. Closure of the contact bar 345 completes a holding circuit from energized conductor 328 to a conductor 346 connected via a closed contact bar 347 of a forward motor plugging relay 350 to a conductor 348 connected to the conductor 330.

As is well known in the art, a movable contact bar of a plugging switch 351 is moved in a clockwise direction whenever the spindle motor 82 is energized for forward rotation. Clockwise rotation of the movable plugging switch contact bar completes a circuit from conductor 270, conductor 352 through the movable contact bar to a conductor connected to energize the forward auxiliary plugging relay 350. The opposite terminal of the coil for relay 350 is connected via a conductor 353 to the energized control conductor 260. Energization of relay 350 effects closure of another contact bar 354 to complete a stop circuit via a conductor 356, to a conductor 357. Whenever the spindle motor is stopped by depressing stop switch 327, a circuit is thus immediately established through the normally closed contact bar 355 of de-energized forward spindle motor relay 337 to energize the reverse motor relay 338. As soon as energization of reverse motor relay 338 stops forward spindle motor rotation, the movable contact bar of the plugging switch 351 drops to an open position to interrupt the plugging circuit to the relay 338.

To effect reverse rotation of the spindle motor 82, the contact bar of spindle directional switch 335 is moved into engagement with a terminal associated with conductor 357. Energization of the reverse motor relay 338 for effecting reversed rotation of motor 82, in turn, operates the plugging switch 351 in a manner to energize a reverse plugging relay 358.

To reposition the spindle quills, that is to extend quill 27 and retract quill 28, the quill selector switch 295 is positioned to complete a circuit from energized conductor 270 to a conductor 361 connected to energize the coil of a quill shift relay 362. This circuit is completed from the opposite terminal of the coil for relay 362 via a conductor 363 to the conductor 260. It will be apparent that such movement of quill selector switch 295 interrupts the circuit to the conductor 296, thereby de-energizing the quill shift relay 297, thus immediately opening the upper contact bar 303 to preclude energization of either of the spindle motor relays 337 or 338. By means of this arrangement, the selector switch 295 may be manipulated to reverse the position of the spindle quills irrespective of whether or not the spindle motor is rotating. In the event the motor 82 is energized to rotate, opening of the upper contact bar 302 immediately interrupts the holding circuit to one or the other of the motor relays and plugs the motor to a stop as hereinbefore explained.

At the same time, upon de-energization of relay 297, the contact bar 303 is moved to open position, thus interrupting the circuit to conductor 308 and effecting de-energization of relays 293 and 313. De-energization of relay 313 effects movement of associated contact bars 369, 370, 371 and 372 to their normally de-energized positions shown in Fig. 6. Further movement of the quill selector switch 295 into fully engaged position with conductor 361 then effects energization of the relay 362 and movement of the associated contact bars 365, 366 and 367 to their closed positions.

To facilitate shiftable engagement of the transfer gear

106, Fig. 5, with gear 73 during extensible movement of quill 27, the creep motor 185 is energized and the clutch 189 is engaged. To accomplish this, as shown in Fig. 6, de-energization of relay 313 closes the upper contact bar 372 to complete circuits for energizing the creep motor and the main hydraulic valve solenoid 218. Initially this circuit is completed from energized conductor 270, via conductor 278, a conductor 376, through normally closed contact bars 377 and 378 to a conductor 379. From the conductor 379, one circuit is completed to energize the coil of a time delay relay 380, the circuit being completed via conductor 381 connected to the conductor 260. The time delay relay 380 delays energization of the creep motor 185 until the spindle motor 82 is plugged to a stop in the event the latter is energized at the moment a quill shift is initiated. From the common conductor 379, another parallel circuit is then completed via a closed contact bar 383 of the time delay relay 380 to a conductor 384. From conductor 384, the circuit continues through the closed contact bar 372 of the relay 313 to a conductor 385, closed contact bar 316 of energized relay 314 to a conductor 386. As hereinbefore explained relay 314 is energized whenever the switches 180, 230, 254 and 255 are in closed position. From the conductor 386, the flow of current continues to energize the coil of a creep motor start relay 387 connected via a conductor 388 to the conductor 260. Energization of the relay 387 effects closure of the three upper contact bars, thereby connecting the power transmitting conductors 267, 268 and 269 to energize the creep motor 185. As soon as the creep motor relay 387 is energized, another circuit is completed from the conductor 386 via a conductor 391, a closed contact bar 392 of relay 387, and a conductor 393 to energize the main hydraulic valve solenoid 218. As hereinbefore explained, energization of solenoid 218 permits a flow of fluid under pressure from the main supply line 133, Fig. 5, to the hydraulic line 190 connected via the drilled line 191 to actuate the multiple disc clutch 189.

Referring again to Fig. 6, during the interval in which the creep motor 185 and solenoid 218 are energized, other circuit relationships are established to effect energization of the quill unclamp solenoid 150 and the quill shift solenoid 159. Closure of the contact bar 366 upon energization of quill shift relay 362 completes a circuit from conductor 270, a conductor 395, closed contact bar 366, closed quill indicating switch 174 to a conductor 396. This circuit continues via the normally closed contact bar 397 of relay 342 and thence via a conductor 398 to energize the quill unclamp solenoid 150. Energization of solenoid 150, Fig. 5, permits a flow of hydraulic pressure fluid via the line 144 to actuate the piston 125, thereby initially actuating switch 180 and, slightly later, switch 182. There is a slight time interval between the actuation of switch 180 and switch 182, the latter not being fully actuated until the quills are in completely unclamped condition. As illustrated in Fig. 6, the initial actuation of switch 180 completes a circuit from conductor 318 to a conductor 402 to establish an overlapping circuit, necessary upon reclamping the quills. In a similar manner, closure of switch 182 completes a circuit from the energized conductor 270 to a conductor 403 and thence through the closed lower contact bar 365 of energized relay 362 to a conductor 404 connected to energize the quill shifting solenoid 159 for effecting outward extensible movement of the spindle quill 27.

As soon as the quill 28 is moved to fully retracted position, and the quill 27 is fully extended, the position indicating switch 174 is actuated into bridging engagement with a conductor 406 to effect a re-energization of the shift completed relay 293 and, upon closure of contact bar 307, the relay 313. Actuation of switch 174, as described, interrupts the flow of current to the conductor 396 to de-energize the solenoid 150, permitting resiliently biased return of the valve spool 139, Fig. 5. With the position of the spindle quills reversed, i.e. quill 27 extended and quill 28 retracted, the position indicating switch 175 is actuated to complete a circuit to a conductor 407, thereby conditioning the circuit for effecting a subsequent quill shifting movement (retracting 27 and extending 28).

During the interval in which the quills are being reclamped, it is necessary to maintain the solenoid 159 energized. This provides a means of hydraulically urging and maintaining the quill 27 in its extreme forward position during the clamping operation. To accomplish this, parallel overlapping circuits are maintained to the solenoid 159. The overlapping circuit is completed immediately upon re-energization of relay 313. Incidentally, energization of relay 313 initially opens the upper contact bar 372 to effect de-energization of the creep motor 185 and de-energization of the main solenoid valve 218, since both the quill shifting and gear shifting operations have been completed, as indicated by actuation of position indicating switch 174. The parallel circuit to solenoid 159 is completed from energized conductor 270, via the conductor 318, the closed contact bar of clamp indicating switch 180 to the conductor 402. From the conductor 402, this circuit continues through the closed contact bar 370 of energized relay 313 to a conductor 409. During reclamping of the spindle quills, the switch 182 is immediately moved to open position, while switch 180 is maintained in upward engagement with conductor 402 until the spindle quills are fully clamped. From the conductor 409, the circuit continues as hereinbefore described via the conductor 403, closed contact bar 365 to the conductor 404 connected to energize solenoid 159. As soon as the quills are fully clamped, the switch 180 is actuated to interrupt the circuit to conductor 402, thereby de-energizing solenoid 159. When this occurs, another circuit is re-established from the conductor 318, closed contact bar 180 to the conductor 319 and the closed switch 230 to a conductor 320 for energizing the relay 314.

As soon as the spindle quills have been axially shifted to the desired position, the spindle motor 82 may be re-energized by momentarily depressing spindle start button switch 326. Whenever the control circuit is energized, it will be apparent that the switch 295 may be moved to complete a circuit, either to the conductor 296 or the conductor 361 for effecting the required quill shifting movement.

As hereinbefore explained, movement of the range change switch 273 is operative to effect shiftable adjustment of the range change couplet 91, Fig. 5. With the switch 273 in open position as shown in Fig. 6, the gear 93 is shifted leftwardly into engagement with the gear 96. With the switch 273 in closed position, the couplet 91 is shifted rightwardly in a manner that the gear 94 engages an internal clutch gear presented by the high speed gear 86. In the event the spindle is rotating, movement of the switch 273 to either open or closed position is arranged to actuate the spindle stop switch 327 by means of a mechanical interlock (not shown). Closure of the switch 273 completes a circuit from energized conductor 270, to a conductor 274 connected to energize the "shift required" range change relay 275, the circuit being completed via the conductor 276 to energized conductor 260. Energization of the relay 275 effects movement of an upper contact bar 277 to interrupt the holding circuit to the relay 284, which is de-energized to open the associated lower contact bar 292. With contact bar 292 in open position, as shown in Fig. 6, the relay 293 is de-energized, effecting a concomitant de-energization of relay 313. Upon movement of relay 313 to its open position, the upper contact bar 372 is moved to normally closed position completing a circuit from the conductor 384 to the conductor 385.

This circuit continues through the closed contact bar 316 of energized relay 314 to effect energization of the creep motor relay 387, as well as the main hydraulic valve solenoid 218. Thus, the creep motor 185 is energized to rotate and, with clutch 189 engaged, operates to drive the transmission and associated drive gears at low speed for facilitating gear shifting. Energization of the solenoid 218 operates to retract locking member 206, Fig. 5, thus actuating switch 230 to open position. Opening of switch 230, Fig. 6, interrupts the holding circuit to relay 314. However, since relay 313 is de-energized, a circuit is established from a conductor 410, closed contact bar 369, a conductor 411, and closed switches 254, 255 to retain the relay 314 energized.

In addition to these circuits, energization of relay 275 to upward closed position completes another circuit for energizing the range change solenoid 227 for axially shifting the range change couplet 91, Fig. 5, as hereinbefore described. This circuit is completed from the conductor 270, the conductor 278, via a conductor 412 and a closed contact bar 413 of energized relay 275 to a conductor 414. The conductor 414 is connected directly to one terminal of the solenoid 227, the opposite terminal being connected to the energized control conductor 260. After the range change couplet has been shifted to its desired high speed driving position, the position indicating switch 282 is moved to an open position and switch 289 is closed.

As hereinbefore explained with reference to Fig. 7, the cam drum 287 is rotated during shiftable adjustment to move the cam lobe 290 into a position to actuate the switch 289 to closed position. As this happens, it will be apparent that the cam lobe 286 is rotatably displaced to permit switch 282 to resume its normally open position. Referring again to Fig. 6, closure of switch 289 initiates a shift completed circuit via a conductor 415 to the conductor 283 connected to energize relay 284. Thereupon, the lower contact bar 292 is closed to re-energize the relay 293 and the relay 313. Energization of relay 313 in turn moves the upper contact bar 372 to open position, thereby interrupting the holding circuit previously established to the creep motor relay 387 and the solenoid 218. De-energization of the solenoid 218 connects the line 190, Fig. 5, to exhaust, disengaging the clutch 189 and permitting resiliently biased re-engagement of locking plunger 206 with the manually rotatable pinion 208. With the range change shift completed, the main spindle drive motor 82 may be re-energized by again momentarily depressing the spindle start button switch 326, Fig. 6.

For indicating the relationship of a cutter to a workpiece, it may be advantageous to disconnect the tool spindle from the range changer and the speed drive mechanism. To accomplish this, as shown in Fig. 7, a manual adjusting knob 416 is outwardly movable in opposition to a spring 417 to withdraw the pinion 208 from engagement with the locking member 206. The adjusting knob 416, cam drum 287, and pinion are secured to a common shaft 401 for simultaneous axial or rotatable movement. Outward movement of the manual adjusting knob 416 moves the cam drum 287 outwardly, thus actuating a switch 418 to its normally open position to interrupt the holding circuits for retaining the spindle motor energized. With the manual knob 416 retained in outward position, the pinion 208 may be rotated to manually move the piston rod 212 and the associated gear couplet 91 to a neutral disengaged position. Upon movement of the gear couplet 91 to neutral disengaged position, the tool spindle is manually rotatable independently of the driving gear trains. After the desired indicating movements have been effected, the manual knob 416 may be again rotated to reposition the couplet in its original position of engagement, with the spring 417 urging the cam drum 287 and pinion 208 inwardly to re-engage the locking member 206. A spring pressed detent 419 is operatively disposed to retain the cam drum and shaft in rotatably adjusted position. The detent 419 operates in well known manner to retain the cam drum, pinion 208 and piston rod 212 in any desired position of adjustment by operatively engaging one or another of three spaced apart longitudinally extending detent grooves 435, 437, 438 presented by the cam drum 287.

Whenever the spindle motor 82 is de-energized, the selector switch 420 may be closed to complete a circuit for positively locking the forwardly extended spindle against rotation to facilitate tool changing or adjustment. With the switch 420 in closed position, a circuit is completed from energized conductor 270, a conductor 421, the normally closed contact bars 422 and 423 and a contact bar 424 of the energized time delay relay 380 to a conductor 425. This circuit continues from the conductor 425 through the closed contact bar 371 of energized relay 313 to a conductor 426. It should be noted that relays 297, 293 and 313 are energized to closed position whenever the spindle quill 28, Fig. 5, is in a forward operating position and the range change shifting couplet is in a proper shiftably adjusted position. With this condition existing, therefore, the circuit continues from conductor 426, the closed contact bar 302, and the closed switch 248 to the conductor 391. As hereinbefore explained, energization of conductor 391 effects a corresponding energization of the creep motor start relay 387 and main hydraulic valve solenoid 218. Thus, the tool spindle is connected for slow speed rotation at the same time another parallel holding circuit is established from the energized conductor 425 via a conductor 427 to energize the spindle latching solenoid 250. Energization of the solenoid 250 operates to supply hydraulic fluid under pressure for urging both of the spindle locking members 64 and 78, Fig. 5, inwardly. Movement of the plunger 64 is delayed momentarily until the spindle 31 is angularly displaced a sufficient distance for the locking notch 63 to be aligned with the locking member 64. Inward movement of the locking member to fully engaged position with the notch, operates to open interlocking switch 248 to de-energize the creep motor relay 387 and solenoid 218. At the same time, with the locking member in fully engaged position, the corresponding interlocking switch 254 is moved to open position to de-energize the relay 314 and preclude energization of the main spindle drive motor 82.

After the desired tool adjustments have been effected, switch 420 may be moved to open position to permit de-energization of the spindle latching solenoid 250, thus effecting a resiliently biased movement of the locking member to fully retracted position. As this occurs, the switches 248 and 254 are both closed. It will be apparent that switch 420 may be utilized to latch whichever of the tool spindles is in forwardly extended operating position. It is not deemed necessary, however, to describe in detail the circuit conditions that are effected for latching the tool spindle 30 against rotation when the quill 27 is in forward operating position. With the quill 27 in forward operating position, relays 362, 293 and 313 are energized to upwardly closed position as hereinbefore explained. With this condition existing, the latching circuit continues from the conductor 426, via closed contact bar 367 of energized relay 362 and thence through the closed switch 249 to the common conductor 391. It will be apparent that completion of the latching circuit through the closed contact bar 367 will again operate to energize the creep motor relay 387 and main hydraulic valve solenoid 218.

While the invention has been shown and described as applied to the shiftably adjustable quills of a spindle driving transmission for a milling machine, it is to be understood that it may be incorporated with equal advantage in moving other major, power driven movable members of a machine tool. Although particular structures have been shown and described in considerable detail as exemplary of the manner in which the invention may be practiced, it will be apparent to those skilled in the art to which this invention relates that various modifications of the structures and control apparatus herein shown may be effected without departing from the spirit and scope of the invention as defined in the subjoined claims.

The principles of this invention having now been fully explained in connection with the foregoing description, we hereby claim as our invention:

1. In a machine tool, a frame, a spindle head slidably carried by said frame for bodily movement in mutually perpendicular planes, a pair of spindle carrying quills slidably carried by said spindle head for axial movement in spaced apart parallelism, a pair of tool spindles respectively journalled to rotate in said quills, a variable speed transmission mechanism connectable to drive one or the other of said tool spindles, a power source connected to supply power for driving said transmission mechanism, a motor connectable to drive said transmission mechanism at slow speed, a control system including power operable means selectively actuatable to extend one of said spindle quills to a forward operating position and simultaneously therewith to retract the other of said spindle quills from its operating position, said control means being operable to effect a simultaneous actuation of said motor for driving said transmission mechanism to facilitate changing the axially adjusted positions of said quills, shiftable gearing movable in coordinated relationship to the axial shifting movement of said spindle quills, said gearing being shiftable to transmit power from said transmission mechanism to drive whichever of said spindles is moved by its associated quill to a forwardly extended operating position, and a lost motion shifting mechanism operatively interconnected between said control means and said shiftable gearing to disengage said transmission from said retracted spindle and to connect said transmission for driving said extended spindle whereby whichever of said spindles is in a forwardly extended operating position is bodily movable with said spindle head for effecting a required machining operation.

2. In a machine tool, a frame, a spindle head slidably carried by said frame, a pair of spindle carrying quills slidably carried by said spindle head for axial movement in spaced apart parallelism, a pair of tool spindles respectively journalled in said quills and being axially positionable therewith, said spindles each presenting a peripherally formed locating notch, power driven means for moving one of said quills to a forwardly extending operating position and simultaneously retracting the other of said quills to an inoperative position, a power driven variable speed transmission mechanism operatively connectable to drive whichever of said spindles is moved to a forward operating position by its associated supporting quill, shiftable gearing operatively interconnected between said transmission mechanism and said spindles, said gearing being disconnectable from the said spindle that is in retracted position and automatically connected to drive the said spindle in forward operating position, control means including a power operable shifting device selectively actuatable to activate said power driven means for effecting simultaneous axial movement of said quills in opposite directions, a gear shifter responsive to said power operable quill shifting device connected to shift said gearing into engagement with whichever of said spindles is in forward operating position, slow speed driving means actuatable to supply power for driving said transmission mechanism during axial shifting movement of said quills, a pair of radially movable index plungers operatively movable to engage the peripheral notches presented by said spindles, a spindle lock control connected to urge said index plungers radially inward to engage the notches presented by said spindles, said spindle lock control being operable to actuate said slow speed driving means in a manner that said forwardly extended spindle is rotated at slow speed until the associated one of said index plungers is moved into engagement with the locking notch presented thereby to retain said forwardly extended spindle in a predetermined angular position, and means responsive to engagement of said index plunger operable to deactuate said slow speed driving means.

3. In a machine tool; a frame; a bodily movable support carried by said frame for selective tool feeding movement; a pair of spindle carrying quills slidably carried by said support for axial movement in parallel planes, a pair of tool spindles respectively journalled in said quills for axial movement therewith; a pinion operably interconnected between said quills in a manner that one of said quills is extensibly moved to a forward operating position as the other of said quills is retracted from its forward operating position; a power driven variable speed transmission mechanism connected to drive whichever of said tool spindles is moved by its associated quill to a forwardly extended operating position; a transfer gear connected to be shiftably moved to transmit power from said transmission mechanism to drive said forwardly extended spindle; a shifting device for adjusting the position of said transfer gear and connected to be actuated by said quill shifting pinion; a releasable clamp mechanism operative to simultaneously clamp both of said quills against axial movement in either direction; and a control system operatively connected to sequentially release said clamp mechanism and actuate said pinion for simultaneously extending a selected one of said quills and said associated tool spindle, to effect a coordinate shifting movement of said transfer gear for driving said extended spindle, and to re-engage said clamp mechanism after said quills have been axially moved to a different axial position of adjustment.

4. In a machine tool, a frame, a pair of spindle carrying quills slidably carried by said frame for axial movement in parallel planes, a pair of tool spindles respectively journalled in said quills, a pinion operatively interconnected between said quills in a manner that one of said quills is extensibly moved to a forward operating position as the other of said spindle quills is retracted from a forward position, a power driven variable speed transmission mechanism connected to drive whichever of said tool spindles is moved by its associated quill to forwardly extended operating position, a transfer gear connected to be shiftably moved to transmit power from said transmission to drive said forwardly extended tool spindle, a shifting device for shiftably adjusting said transfer gear and connected to be actuated by said quill shifting pinion, and a control system operatively connected to actuate said pinion for simultaneously extending a selected one of said quills and said associated tool spindle and to effect a coordinate shifting movement of said transfer gear whereby a selected one of said tool spindles is operative to perform a cutting operation.

5. In a machine tool, a frame, a pair of spindle carrying quills slidably carried by said frame for axial movement in spaced apart parallelism, a tool spindle journalled in each of said spindle quills, a variable speed transmission mechanism connectable to drive one or the other of said tool spindles, an electro-hydraulic control system operatively connected to move one of said spindle quills axially to a forwardly extended operating position and simultaneously therewith to retract the other of said spindle quills, shiftable gearing movable in coordinated relationship to the axial shifting movement of said spindle quills, said shiftable gearing being connectable to transmit power from said transmission mechanism to drive whichever of said tool spindles is extended, a lost motion shifting mechanism operatively interconnected between said control means and said shiftable gearing, slow speed driving means connected to drive said transmission mechanism to facilitate shiftable engagement of said shiftable gearing, said slow speed driving means connected to be activated by said electro-hydraulic control system, and a releasable clamp mechanism automatically operative to clamp both of said quills against axial movement whenever one of said quills is in its selected forward operating position.

6. In a machine tool, a bodily movable tool feeding spindle head, a plurality of tool spindles movably carried by said head for selective axial positioning movement, a positioning control operatively actuatable to axially move one or the other of said tool spindles from a retracted to an extended operating position, a power driven transmission mechanism including a shiftable transfer gear, said transfer gear being shiftably movable in simultaneous coordinated relationship with the said spindle being axially shifted to forwardly extended operating position, said transfer gear being connected to transfer power from said transmission to drive whichever of said tool spindles is axially positioned in an extended operating position and disconnected from the other of said spindles.

7. In a boring machine, a frame, a pair of quills slidably supported by said frame in spaced apart parallelism, gearing interconnected between said quills in a manner that extension of one quill to a forward operating position effects retraction of the other, a pair of tool spindles respectively journalled in said quills, a power driven variable speed transmission mechanism connectable to drive one or the other of said tool spindles, shiftable gearing operatively interconnected to transmit power from said variable speed transmission to drive whichever of said spindles is in extended operating position, control means connected to selectively extend one of said spindle quills and retract the other of said spindle quills, and a lost motion shifting mechanism operatively interconnected between said control means and said shiftable gearing whereby said variable speed transmission is connected to drive said extended spindle and disconnected from said retracted spindle.

8. In a machine tool, a frame, a pair of spindle carrying quills slidably carried by said frame for axial movement in spaced apart parallelism, a tool spindle journalled in each of said spindle quills, a variable speed transmission mechanism connectable to drive one or the other of said tool spindles, an electro-hydraulic control system operatively connected to extend one of said spindle quills to an operating position and simultaneously therewith to retract the other of said spindle quills, shiftable gearing movable in coordinated relationship to the axial shifting movement of said spindle quills, said shiftable gearing being connectable to transmit power from said transmission mechanism to drive whichever of said spindles is extended, a lost motion shifting mechanism operatively interconnected between said control means and said shiftable gearing, and slow speed driving means connected to drive said transmission mechanism to facilitate engagement of said shiftable gearing, said slow speed driving means connected to be activated by operation of said electro-hydraulic control system to effect axial shifting movement of said quills.

9. In a machine tool; a frame; a pair of spindle carrying quills slidably carried by said frame for axial movement in parallel planes; a pair of tool spindles respectively journalled in said quills; a pinion operatively interconnected between said quills in a manner that one of said quills is extensibly moved to a forward operating position as the other of said spindle quills is retracted from a forward position; a power driven variable speed transmission mechanism connected to drive whichever of said tool spindles is moved by its associated quill to forwardly extended operating position; a transfer gear connected to be shiftably moved to transmit power from said transmission to drive said forwardly extended tool spindle; a shifting device for shiftably adjusting said transfer gear and connected to be actuated by said quill shifting pinion; a slow speed driving mechanism connectable to rotate said transmission at slow speed to facilitate axial shifting movement of said quills and said transfer gear into engagement with one or the other of said tool spindles; and a control system operatively connected to actuate said pinion for simultaneously extending a selected one of said quills, to effect a coordinate shifting movement of said transfer gear, and to actuate said slow speed driving mechanism.

10. In a machine tool, a bodily movable tool feeding spindle head, means for moving said spindle head to effect a milling operation, a plurality of tool spindles movably carried by said head for rotation and for selective axial positioning movement, a plurality of driving gears respectively secured to said spindles, a positioning control system selectively actuatable to axially move a selected one of said tool spindles from a retracted to a forwardly extended operating position, a power driven transmission mechanism including a shiftable transfer gear, said transfer gear being shiftably movable in simultaneous coordinated relationship with the said spindle being axially shifted to forward operating position, said transfer gear being continuously connected to receive power from said transmission and being shiftably connectable to drive whichever of said tool spindles is axially positioned in a forwardly extended operating position, and slow speed driving means connectable to drive said transmission mechanism to facilitate gear shifting and being selectively activated upon actuation of said positioning control system.

11. In a machine tool, a frame, a spindle head operatively carried by said frame for bodily movement in a plurality of mutually transverse planes, a plurality of spindle carrying quills slidably carried by said spindle head for axial positioning movement, a plurality of tool spindles respectively journalled in said quills, a selectively operable control system including a source of power connected to move a selected one of said quills from a retracted position to a forwardly extended operating position, a power driven variable speed transmission mechanism automatically connectable to drive whichever of said spindles is moved by its associated quill to a forwardly extended operating position, a movable transfer gear continuously connected to be driven by said transmission mechanism and being shiftably engageable to drive only the forwardly extended tool spindle, a selectively energizable slow speed driving mechanism connectable to rotate said transmission to facilitate shiftable engagement of said transfer gear during axial shifting movement of said quills, and means responsive to operation of said control system actuatable to simultaneously energize said slow speed driving mechanism and connect it to drive said transmission mechanism.

12. In a machine tool; a frame; a bodily movable support carried by said frame for selective tool feeding movement; a pair of spindle carrying quills slidably carried by said support for axial movement in parallel planes, a pair of tool spindles respectively journalled in said quills for axial movement therewith; a pinion operably interconnected between said quills in a manner that one of said quills is extensibly moved to a forward operating position as the other of said quills is retracted from its forward operating position; a power driven variable speed transmission mechanism connected to drive whichever of said tool spindles is moved by its associated quill to a forwardly extended operating position; a selectively energizable slow speed drive operable to drive said transmission mechanism; a transfer gear connected to be shiftably moved to transmit power from said transmission mechanism to drive said forwardly extending tool spindle; a shifting device for adjusting the position of said transfer gear and connected to be actuated by said quill shifting pinion; a releasable clamp mechanism operative to simultaneously clamp both of said quills against axial movement in either direction; and a selectively actuatable control system operatively connected to sequentially release said clamp mechanism and actuate said pinion for simultaneously extended a selected one of said quills and said associated tool spindle, to energize said slow speed drive for driving said transmission mechanism, to effect a coordinate shifting movement of said transfer gear for driving said extended spindle, and to re-engage said clamp mechanism after said quills have been axially moved to a different axial position of adjustment.

References Cited in the file of this patent

UNITED STATES PATENTS

| | | |
|---|---|---|
| 376,838 | Whitney | Jan. 24, 1888 |
| 1,969,791 | Gallimore | Aug. 14, 1934 |
| 2,400,819 | Gallimore | May 21, 1946 |
| 2,646,152 | Retz | July 21, 1953 |
| 2,774,250 | Gallimore | Dec. 18, 1956 |